(12) United States Patent
Buckhalt

(10) Patent No.: US 10,076,991 B2
(45) Date of Patent: Sep. 18, 2018

(54) BED EXTENDER INCORPORATING ONE OR MORE RETRACTABLE LINES

(71) Applicant: FORD GLOBAL TECHNOLOGIES, LLC, Dearborn, MI (US)

(72) Inventor: Brandon Ryan Buckhalt, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/137,450

(22) Filed: Apr. 25, 2016

(65) Prior Publication Data
US 2017/0305325 A1    Oct. 26, 2017

(51) Int. Cl.
*B60P 3/40* (2006.01)
*B62D 33/03* (2006.01)
*B60R 9/06* (2006.01)
*B60R 5/04* (2006.01)

(52) U.S. Cl.
CPC ............... *B60P 3/40* (2013.01); *B60R 5/041* (2013.01); *B60R 9/06* (2013.01); *B62D 33/03* (2013.01)

(58) Field of Classification Search
CPC ............................... B60R 5/041; B62D 33/03
USPC ....... 296/26.08, 26.1, 26.11, 57.1, 186.2, 50, 296/37.16, 37.13; 410/94, 111, 107, 140, 410/153, 97, 100, 117, 118, 155; 182/112; 224/403
See application file for complete search history.

(56) References Cited

U.S. PATENT DOCUMENTS

| | | | | |
|---|---|---|---|---|
| 2,808,009 A | * | 10/1957 | Rogalla | B60P 7/14 410/117 |
| 5,868,449 A | * | 2/1999 | Hitchcock | B62D 33/0273 296/26.02 |
| 5,961,263 A | * | 10/1999 | Nunez | B60P 7/0846 410/100 |
| 6,082,801 A | * | 7/2000 | Owen | B60P 3/40 296/26.08 |
| 6,109,846 A | * | 8/2000 | Davis | B60P 7/0846 410/100 |
| 6,149,219 A | * | 11/2000 | Schambre et al. | 296/57.1 |
| 6,210,087 B1 | | 4/2001 | Bacon | |
| 6,454,338 B1 | * | 9/2002 | Glickman | B60P 1/435 296/26.1 |
| 6,932,287 B2 | * | 8/2005 | Kost et al. | E01C 19/203 222/608 |

(Continued)

OTHER PUBLICATIONS

Sterley, Greg; "Getting There and Back—Bed Extenders"; Kayak Fishing Ultimate Resource; http://www.yakangler.com/kayak-rigging/item/3683-getting-there-and-back-bed-extenders; May 13, 2015; pp. 1-7.

(Continued)

*Primary Examiner* — Dennis H Pedder
(74) *Attorney, Agent, or Firm* — Jason Rogers; King & Schickli, PLLC

(57) ABSTRACT

A bed extender is provided for a bed of a truck. That bed extender includes a reel mounted to a first sidewall of the bed, a line received on that reel, and a fastener carried on a distal end of the line. An anchor is carried on a second sidewall of the bed. In addition, the bed extender includes a support arm including a receiver that engages the line when the line is extended from the reel and fastened to the anchor. The support arm is mounted to the tailgate of the truck.

19 Claims, 4 Drawing Sheets

(56) References Cited

U.S. PATENT DOCUMENTS

| | | | |
|---|---|---|---|
| 7,040,683 B1 | 5/2006 | Beach | |
| 7,044,699 B1 | 5/2006 | St. Denis | |
| 7,182,380 B2 | 2/2007 | Nagle | |
| 7,217,074 B1* | 5/2007 | Huber | B60P 3/40 410/100 |
| 7,530,619 B1* | 5/2009 | Bruford et al. | 296/62 |
| 8,109,552 B2 | 2/2012 | Nelson | |
| 8,146,786 B2 | 4/2012 | Cheung et al. | |
| 8,950,989 B1* | 2/2015 | Rivera | B60P 7/0823 410/118 |
| 2002/0121794 A1* | 9/2002 | Vejnar | B62D 33/0273 296/50 |
| 2004/0174032 A1* | 9/2004 | Vejnar | B62D 33/0273 296/26.11 |
| 2004/0227368 A1* | 11/2004 | Seksaria | B60P 3/40 296/26.1 |
| 2005/0073165 A1* | 4/2005 | Vejnar | B62D 33/0273 296/26.11 |
| 2008/0231067 A1 | 9/2008 | Nagle | |
| 2008/0315608 A1* | 12/2008 | Heller | B60P 7/14 296/50 |
| 2009/0273202 A1* | 11/2009 | Heaman | B62D 33/0273 296/26.1 |

OTHER PUBLICATIONS

Hughes, Richard; "Hammer Tested: Shark Kage Multi Use Ramp"; dirthammer.com Off Road Journal; http://dirthammers.com/2014/09/hammer-tested-shark-kage-multi-use-ramp-2/; pp. 1-10.

\* cited by examiner

BED EXTENDER INCORPORATING ONE OR MORE RETRACTABLE LINES

TECHNICAL FIELD

This document relates generally to the motor vehicle equipment field and, more particularly, to a bed extender for the bed of a truck that incorporates at least one retractable line.

BACKGROUND

Many truck owners, especially those with short bed trucks such as crew cab pickup trucks, find it useful to be able to leave the tailgate in the down position and to utilize a bed extender to safely secure more cargo and/or longer cargo. Bed extenders known in the art typically pivot about their attachment point at the sides of the truck bed between a stowed position inside the bed, allowing the tailgate to be closed, and a deployed position across the tailgate when the tailgate is opened. A down side of such bed extenders is that they are typically semi permanently attached to the truck bed and may interfere with the transportation of cargo when not in use. Further, in the event the owner of the motor vehicle removes the bed extender and stores it in the garage, it may not be with the motor vehicle when needed most. Of course, the installation and removal of such a bed extender is often time-consuming and definitely inconvenient. In fact some designs are cumbersome to install and uninstall.

This document relates to a new and improved bed extender that is fully integrated into the sidewalls and tailgate of the truck so as to always be available for use when needed yet stowed completely out of the way when not in use so as to not interfere with the hauling of any cargo in the cargo bed at any time.

SUMMARY

In accordance with the purposes and benefits described herein, a bed extender is provided for a bed of a truck. That bed extender comprises a reel mounted to a first sidewall of the bed, a line received on the reel, a fastener carried on the line and an anchor carried on a second sidewall of the bed. Further, the bed extender includes a first support arm having a receiver for engaging the line when the line is extended from the reel and fastened to the anchor.

That first support arm may be mounted to a tailgate of the truck. In one possible embodiment, a pivot mounts the first support arm to the tailgate so that the first support arm may be displaced between a stowed position adjacent the tailgate and a deployed position projecting from the tailgate.

The bed extender may further include a second support arm connected by a second pivot to the tailgate at a position spaced from the first support arm. Like the first support arm, the second support arm may include a second receiver engaging the line when the line is extended from the reel and fastened to the anchor.

The bed extender may further include a second reel mounted to the first sidewall of the bed, a second line received on the second reel and a second fastener carried on the second line. Still further, the bed extender may include a second anchor carried on the second sidewall of the bed.

In accordance with an additional aspect, a pickup truck is provided. That pickup truck comprises a load bed including a first sidewall, a second sidewall and a tailgate. At least one support arm is carried on the tailgate and at least one retractable line (a) extends between the first sidewall and the second sidewall and (b) across the at least one support arm.

The at least one support arm includes a receiver for engaging the retractable line. Further, the at least one support arm may include a pivot mounting the at least one support arm to the tailgate. Still further, the tailgate may include a recess and the at least one support arm may be displaceable between a stowed position within the recess and a deployed position projecting out of the recess and from the tailgate.

Further, a lock mechanism may be provided to lock the at least one support arm in the stowed position and the deployed position.

In one possible embodiment the pickup truck includes two support arms carried on the tailgate and two retractable lines extending between the first sidewall and the second sidewall across the two support arms. Those two support arms may each include two receivers to engage the two retractable lines.

In another possible embodiment, the pickup truck includes three support arms carried on the tailgate and two retractable lines extending between the first sidewall and the second sidewall across the three support arms. Those three support arms may each include two receivers to engage the two retractable lines.

Consistent with still another aspect, a method is provided of extending a bed of a truck. That method comprises the steps of: (a) lowering a tailgate of the truck, (b) erecting at least one support arm on the tailgate, and (c) extending a line from a first sidewall of the bed across the at least one support arm to a second sidewall of the bed. Further, the method may include pivoting the at least one support arm into an upright position and paying out the line from a reel.

In the following description, there are shown and described several preferred embodiments of the bed extender and the related method of extending a bed of a truck. As it should be realized, the bed extender and related method are capable of other, different embodiments and their several details are capable of modification in various, obvious aspects all without departing from the bed extender and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the bed extender and the related method and together with the description serve to explain certain principles thereof. In the drawing figures:

FIG. 1 illustrates the tailgate in an open position with the support arms stowed flat against the tailgate and the lines retracted on reels in the right sidewall.

Reference will now be made in detail to the present preferred embodiments of the bed extender, examples of which are illustrated in the accompanying drawing figures.

DETAILED DESCRIPTION

Figure 1:
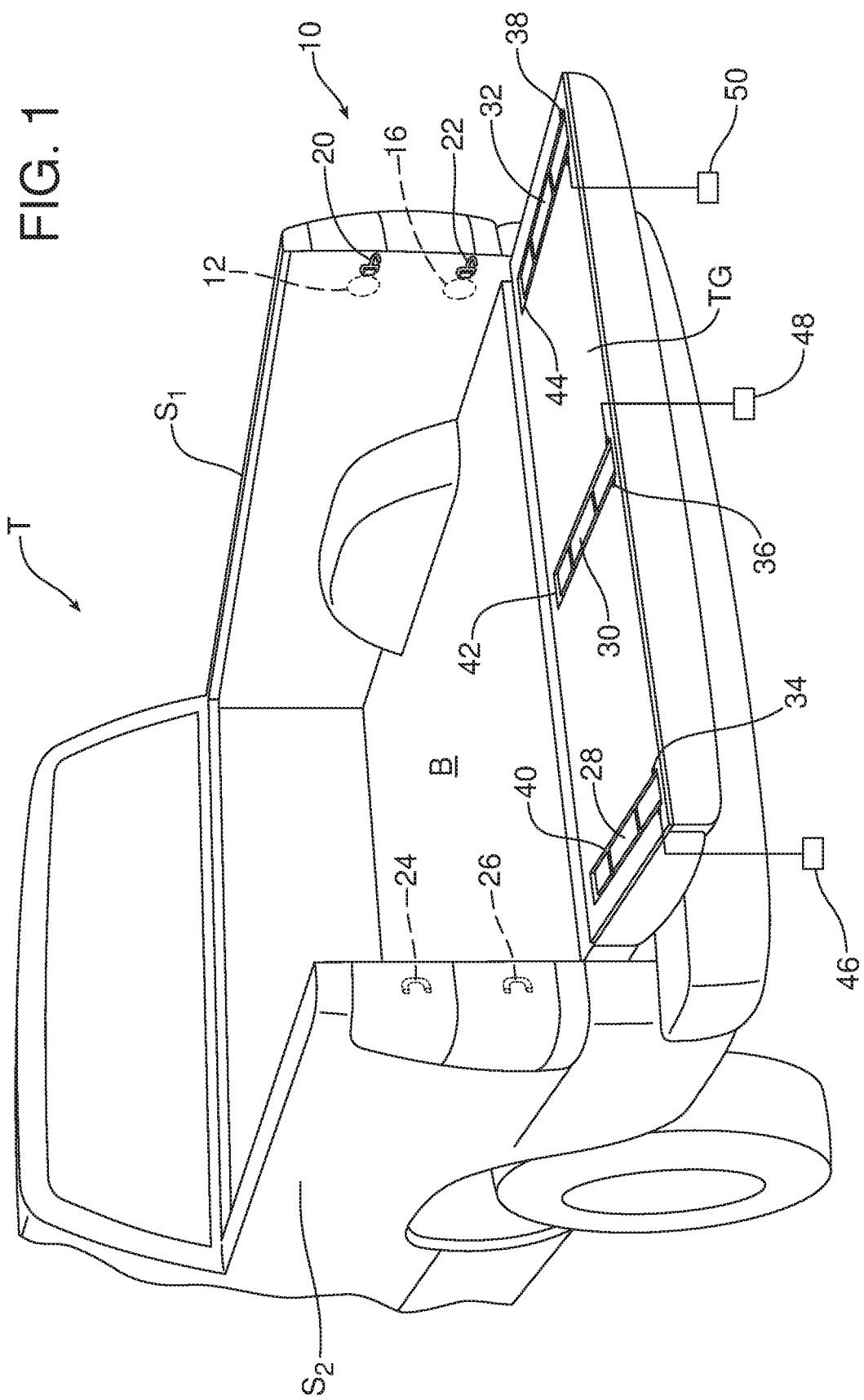
FIG. 1 is a rear perspective view of a pickup truck incorporating the bed extender.

Reference is now made to FIGS. 1-4 illustrating a pickup truck T including a bed B having a first sidewall $S_1$, a second sidewall $S_2$ and a tailgate TG. As illustrated in FIG. 1, the tailgate TG is in an open, horizontal position.

The pickup truck T incorporates the bed extender 10. In the illustrated embodiment, the bed extender 10 includes a first takeup reel 12 for paying out and retracting a first line 14 and a second pickup reel 16 for taking up and paying out a second line 18 (See FIGS. 1 and 3). In the illustrated embodiment, the two takeup reels 12, 16 are mounted within the same sidewall $S_1$. The lines 14, 18 may comprise fabric straps, ropes, cables or the like.

The distal end of the first line 14 includes a first fastener 20 while the distal end of the second line 18 includes a second fastener 22. In the illustrated embodiment, the two fasteners 20, 22 each comprise hooks. It should be appreciated, that they may assume substantially any other appropriate form. A first anchor 24 and a second anchor 26 are carried on the opposing sidewall $S_2$.

As further illustrated in FIG. 1, the bed extender 10 includes three support arms 28, 30 and 32 which are pivotally attached by respective pivots 34, 36 and 38 to the tailgate TG. In the illustrated embodiment, those pivots 34, 36, 38 each comprise a simple pivot pin. As illustrated in FIG. 1, the first support arm 28 is provided at the left rear corner of the tailgate TG, the second support arm 30 is provided at the middle of the tailgate and the third support arm 32 is provided at the right rear corner of the tailgate.

As illustrated in FIG. 1, each of the support arms 28, 30, 32 is in a stowed position resting in cooperating recesses 40, 42, 44 provided in the tailgate TG. Locking mechanisms 46, 48, 50, schematically illustrated in FIG. 1, may be provided to lock the support arms 28, 30, 32 in the stowed position where they may be maintained out of the way when hauling cargo and substantially prevented from rattling. The locking mechanisms 46, 48, 50 may comprise a simple follower and cooperating support arm guide of the type found in FIGS. 8 and 9 of U.S. Pat. No. 8,919,853 or any other appropriate structure suitable to lock the support arms 28, 30 and 32 in the stowed and/or deployed positions.

Figure 2:
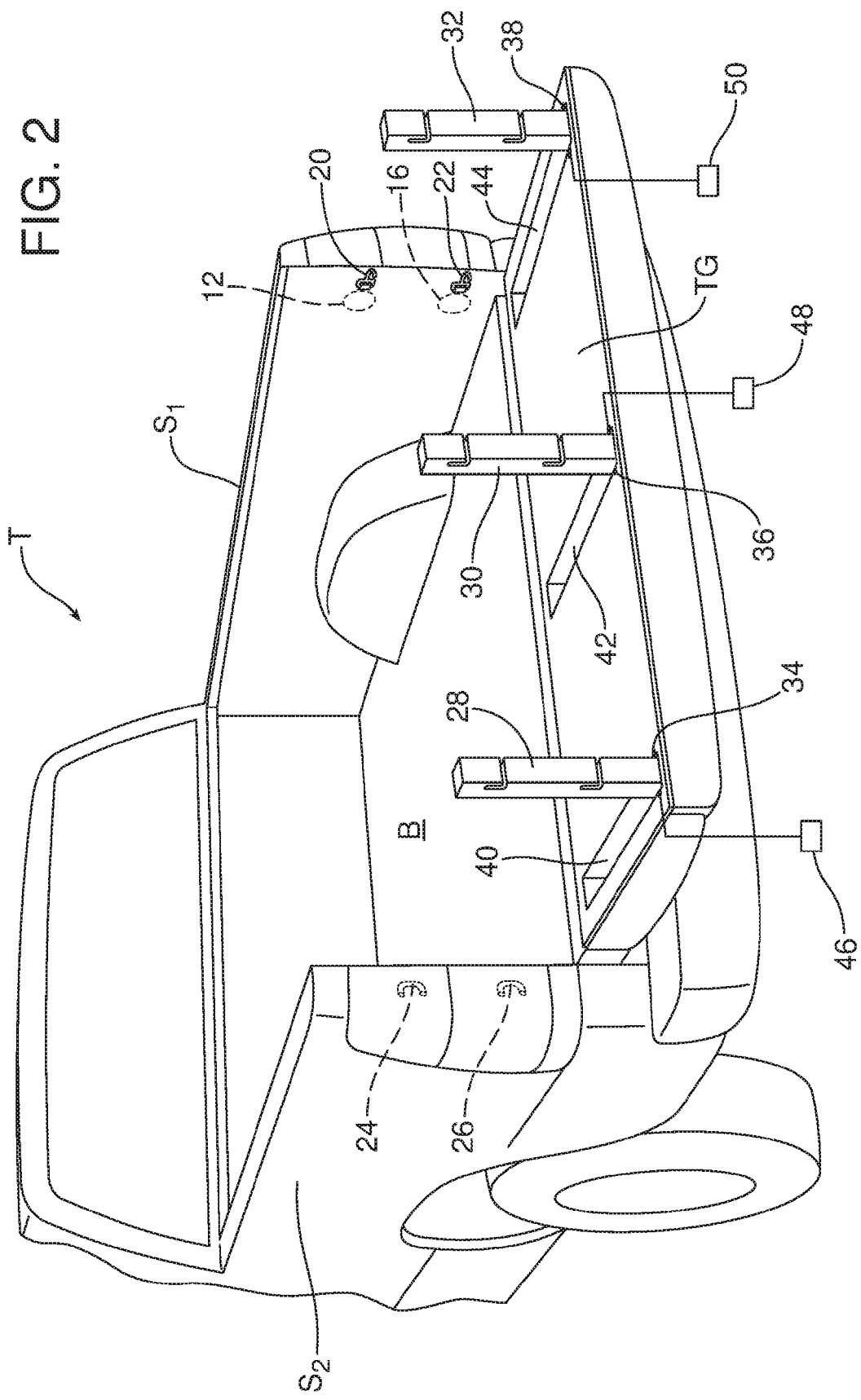
FIG. 2 is a view similar to FIG. 1 but showing the support arms raised and locked into the vertically oriented, deployed positions.

When one wishes to utilize the bed extender 10, the tailgate TG is first lowered into the horizontal position illustrated in FIGS. 1 and 2. Next, the support arms 28, 30, 32 are all erected or displaced into a vertically oriented, deployed position (see FIG. 2) by pivoting about the pivots 34, 36, 38 and locking them in place with the locking mechanisms 46, 48, 50. Next, as illustrated in FIG. 3, the first line 14 is extended from the first takeup reel 12 threaded into receivers 52, 54, 56 provided on the respective support arms 28, 30 and 32 and then the fastener 20 is connected to the first anchor 24 on the opposite sidewall $S_2$.

The second line 18 is then paid out from the second takeup reel 16, extended around the support arms 28, 30, 32 with the line engaged in the receivers 58, 60, 62 on those support arms and the second fastener 22 is secured to the second anchor 26 on the opposite sidewall $S_2$. The two takeup reels 12, 16 include a line lock that may be engaged by the operator to prevent any more line from being payed out once the fasteners 20, 22 have been secured to the anchors 24, 26 and any slack has been removed from the lines 14, 18.

Figure 4:
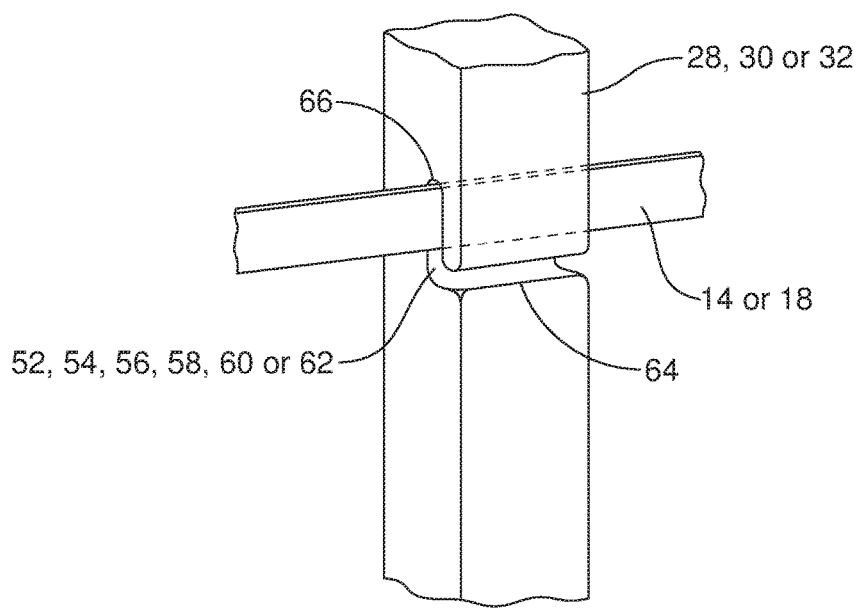
FIG. 4 is a detailed perspective view illustrating one line received in a receiver notch on a support arm.

As best illustrated in FIG. 4, in the illustrated embodiment, the receivers 52, 54, 56, 58, 60 and 62 each comprise a blind, L-shaped notch with an opening 64 at one end to receive the line 14 or 18 and a closed end 66 to hold that line in position.

Figure 3:
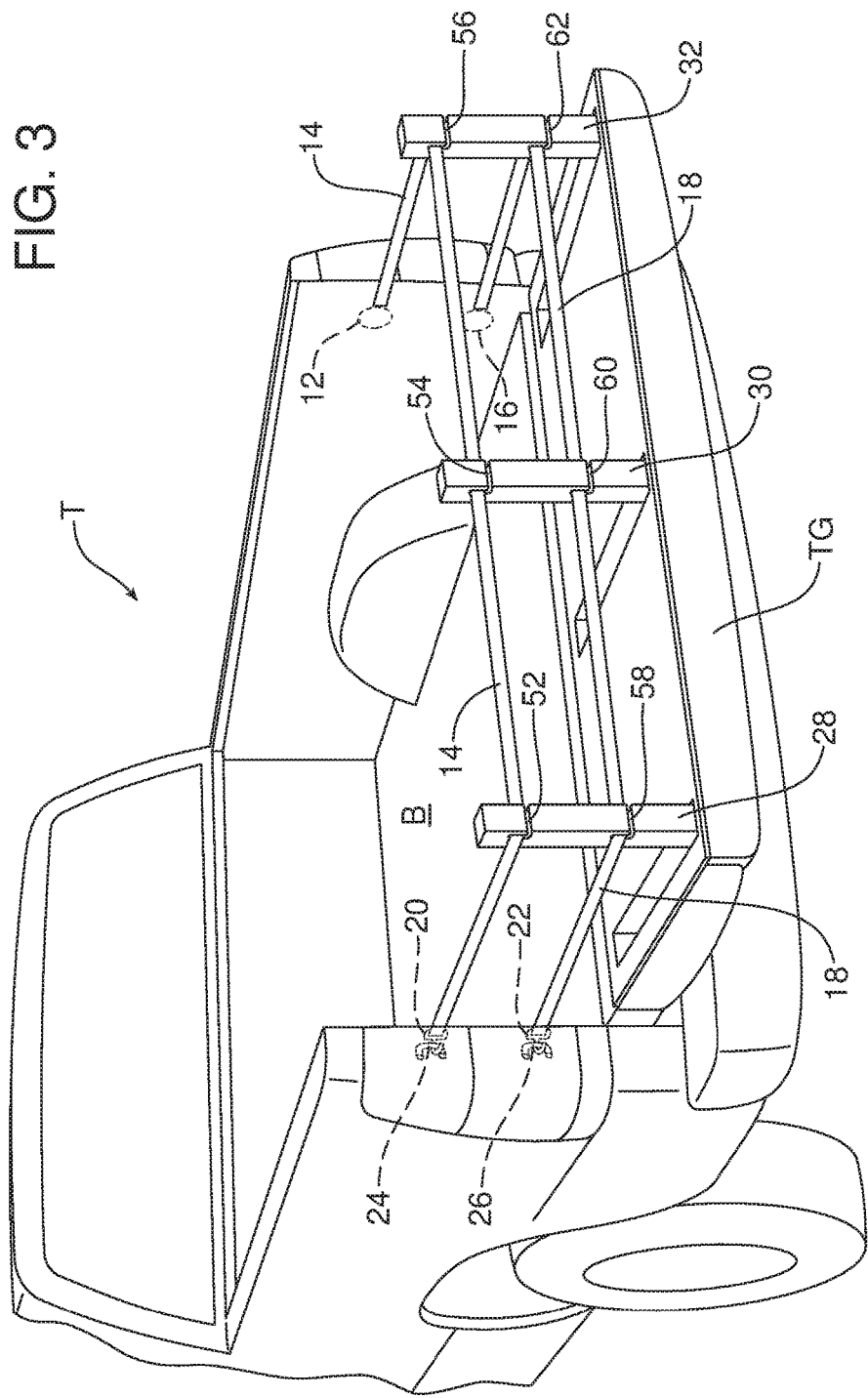
FIG. 3 is a view similar to FIG. 2 showing the lines payed out from the reels and received in receivers in the support arms with the hooks at the end of the lines connected to anchors carried on the opposite sidewall.

As should be appreciated, when deployed as illustrated in FIG. 3, the bed extender 10 functions to hold cargo in the bed B and on the upper surface of the tailgate TG thereby effectively increasing the capacity of the bed B. Advantageously, the lines 14, 18 and support arms 28, 30, 32 may all be used as effective tie down points for holding cargo in position.

When the vehicle owner no longer needs to utilize the bed extender 10 the fasteners 20, 22 are disconnected from the anchors 24, 26. The first and second lines 14, 18 are then manipulated to remove them from the openings 64 of the receivers 52, 54 56, 58, 60 and 62 in the support arms 28, 30, 32 and the takeup reels 12, 16 are allowed to take up the slack in the respective lines 14, 18 all the way to the fasteners 20, 22. Thus, it should be appreciated that the lines 14, 18 and even the fasteners 20, 22 are stowed out of the way where they are readily available for use.

Next, the locking mechanisms 46, 48 and 50 are released and the support arms 28, 30 and 32 are displaced about the pivots 34, 36 and 38 back to the stowed position within the respective recesses 40, 42, 44 in the tailgate TG. The locking mechanisms 46, 48 and 50 are then re-engaged to positively hold the support arms 28, 30 and 32 in that position within the recesses where they are completely out of the way. The tailgate TG may then be closed if desired. When closed, the tailgate covers the fasteners 20, 22 in the sidewall $S_1$ and the anchors 24, 26 on the sidewall $S_2$ so as to provide an aesthetically pleasing appearance.

In summary, numerous benefits and advantages are provided by the bed extender 10. As should be appreciated, the bed extender 10 is fully integrated into the pickup truck T where it is always available when needed. The simple pivoting support arms 28, 30, 32 and the retractable lines 14, 18 may be conveniently deployed when the bed extender 10 is needed in a quick and efficient manner. Similarly, they may also be quickly and easily stowed when the bed extender 10 is not required.

The foregoing has been presented for purposes of illustration and description. It is not intended to be exhaustive or to limit the embodiments to the precise form disclosed. Obvious modifications and variations are possible in light of the above teachings. For example, the illustrated embodiment includes three support arms 28, 30 and 32. Fewer or more support arms may be provided. The support arms 28, 30 and 32 are also pivotally connected to the tailgate. Connections other than pivotal could be provided. Still further, the illustrated embodiment includes two takeup reels 12, 16 and two lines 14, 18. Fewer or more takeup reels and lines may be provided if desired. All such modifications and variations are within the scope of the appended claims when interpreted in accordance with the breadth to which they are fairly, legally and equitably entitled.

What is claimed:

1. A bed extender for a bed of a truck, comprising:
   a reel mounted to a first sidewall of said bed;
   a line received on said reel;
   a fastener carried on said line;
   an anchor carried on a second sidewall of said bed;
   a first support arm mounted toll within a first recess in a tailgate of said truck, said first support arm including a receiver engaging said line when said line is extended from said reel and fastened to said anchor; and a second support arm mounted within a second recess in the tailgate of said truck, whereby the first and second support arms are extendable into a deployed position by pivoting toward a rear of the tailgate.

2. The bed extender of claim 1, including a pivot mounting said first support arm to said tailgate whereby said first support arm may be displaced between a stowed position adjacent said tailgate and the deployed position projecting from said tailgate.

3. The bed extender of claim 2, wherein the second support arm is connected by a second pivot to said tailgate at a position spaced from said first support arm.

4. The bed extender of claim 3, wherein said second support arm includes a second receiver engaging said line when said line is extended from said reel and fastened to said anchor.

5. The bed extender of claim 4, further including a second reel mounted to said first sidewall of said bed, a second line received on said second reel and a second fastener carried on said second line.

6. The bed extender of claim 5, further including a second anchor carried on said second sidewall of said bed.

7. The bed extender of claim 6, wherein said first support arm includes a third receiver engaging said second line when said second line is extended from said second reel and fastened to said second anchor.

8. The bed extender of claim 7, wherein said second support arm includes a fourth receiver engaging said second line when said second line is extended from said second reel and fastened to said second anchor.

9. A pickup truck, comprising:
a load bed including a first sidewall, a second sidewall and a tailgate;
a first support arm carried within a first recess of said tailgate;
a second support arm carried within a second recess of said tailgate; and
at least one retractable line (a) extending between said first sidewall and said second sidewall and (b) across said first and second support arms.

10. The pickup truck of claim 9, wherein each of said first and second support arms includes a receiver for engaging said at least one retractable line.

11. The pickup truck of claim 10, wherein each of said first and second support arms includes a pivot mounting each of said first and second support arms to said tailgate.

12. The pickup truck of claim 11, wherein said first support arm is displaceable between a stowed position within said first recess and a deployed position projecting from said tailgate.

13. The pickup truck of claim 12, further including a lock mechanism to lock said first support arm in said deployed position.

14. The pickup truck of claim 9, including two retractable lines extending between said first sidewall and said second sidewall across said first and second support arms.

15. The pickup truck of claim 14, wherein said first and second support arms each include two receivers to engage said two retractable lines.

16. The pickup truck of claim 9, including a third support arm carried within a third recess of said tailgate and two retractable lines extending between said first sidewall and said second sidewall across said first, second and third support arms.

17. The pickup truck of claim 16, wherein said first, second and third support arms each include two receivers to engage said two retractable lines.

18. A method of extending a bed of a truck, comprising:
lowering a tailgate of said truck;
erecting a first support arm from a first stored position within a first recess on said tailgate;
erecting a second support arm from a second stored position within a second recess on said tailgate;
pivoting said first and second support arms into an upright position; and
extending a line from a first sidewall of said bed across said first and second support arms to a second sidewall of said bed.

19. The method of claim 18, including paying out said line from a reel.

* * * * *

UNITED STATES PATENT AND TRADEMARK OFFICE
CERTIFICATE OF CORRECTION

PATENT NO.         : 10,076,991 B2                                         Page 1 of 1
APPLICATION NO.    : 15/137450
DATED              : September 18, 2018
INVENTOR(S)        : Brandon Ryan Buckhalt It is certified that error appears in the above-identified patent and that said Letters Patent is hereby corrected as shown below:

In the Claims

Column 4, Line 64 please replace "mounted toll within" with ---mounted within---.

Signed and Sealed this
Sixth Day of November, 2018

Andrei Iancu
*Director of the United States Patent and Trademark Office*